Jan. 6, 1970  KOICHI FUKATSU ET AL  3,488,351
METHOD FOR CONTINUOUS PRODUCTION OF 2-OXO-4-METHYL-6-UREIDO
-HEXAHYDROPYRIMIDINE
Filed Sept. 19, 1966

United States Patent Office 3,488,351
Patented Jan. 6, 1970

3,488,351
METHOD FOR CONTINUOUS PRODUCTION OF 2 - OXO - 4 - METHYL-6-UREIDO-HEXAHYDROPYRIMIDINE
Koichi Fukatsu and Masaharu Fukushima, both of 1-1 Naguchicho, Minamatashi, Kumamotoken, Japan, and Hiroaki Ishibashi, 44 Otsutomocho, Kanazawaku, Yokohamashi, Kanagawaken, Japan
Filed Sept. 19, 1966, Ser. No. 580,553
Int. Cl. C07d 51/18
U.S. Cl. 260—256.4             2 Claims

ABSTRACT OF THE DISCLOSURE

A continuous method for the production of 2-oxo-4-methyl-6-ureido-hexahydropyrimidine from urea and acetaldehyde which comprises transferring the reaction solution in a first zone to a second zone before the precipitation of 2-oxo-4-methyl-6-ureido-hexahydropyrimidine starts while cooling the reaction solution in the first zone and continuing the reaction in the second zone.

---

Figure 1:
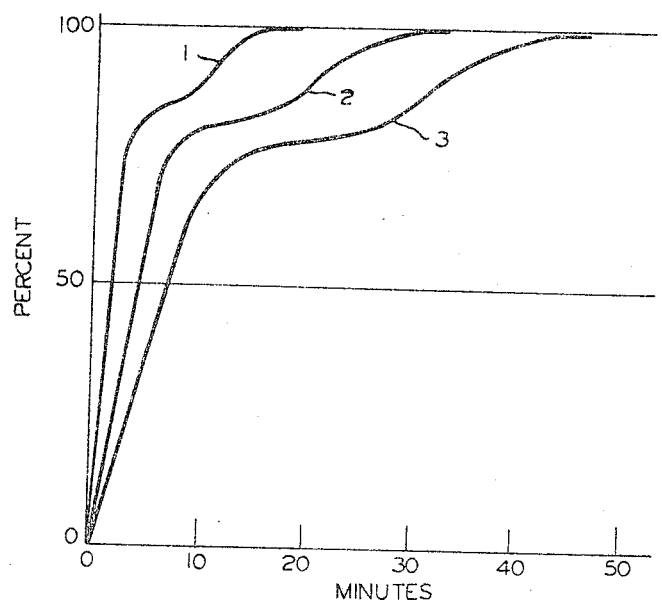

This invention relates to a method for the continuous production of 2-oxo-4-methyl-6-ureido-hexahydropyrimidine. This compound has a molecular structure expressed by a formula of

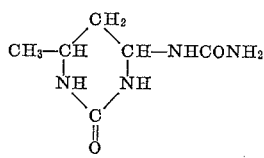

and will be abbreviated hereinafter throughout this specification as CDU. It is a compound, difficultly soluble in water and organic solvents, which does not possess the properties common to inorganic fertilizers such as, being readily washed away by water and producing immediate effect. Since it has a ring structure as above-indicated, it is hardly decomposed by soil bacteria and possesses a unique position as a slow-acting fertilizer. Further it is an interesting compound also as a raw material for various kinds of chemicals and medicines.

However, the method for producing CDU efficiently in the continuous manner in the commercial operation has not been developed yet.

Accordingly, it is an object of the present invention to provide a method for producing CDU efficiently at a high product yield in the continuous manner by maintaining the most preferable reaction temperature throughout the entire reaction course. It is another object of the present invention to provide a method for producing CDU with a nice thermal economy, while making good use of a part of reaction heat and without supplying heat from the outside of the reaction system.

These objects and other advantages can be attained by the method of the present invention. According to the method of the present invention, the reaction of acetaldehyde and urea is carried out in at least two steps to produce CDU by using two or more reactors arranged in series. Most of the reaction heat is eliminated at the first step reaction which terminates just before the CDU begins to precipitate, in order to be able to maintain the most preferable reaction temperature and to make the reaction proceed smoothly and continuously.

CDU can be produced by the reaction of one mol of crotonaldehyde and two mols of urea. It can be also produced in an acidic medium by the reaction of two mols of acetaldehyde (ACH) and two mols of urea. As for the latter, there are reports in Monatschefte fur Chemie 92 Band S. 34 and the Japanese Gazette of notice of patent application No. 28338/64. According to the said Japanese Gazette, CDU can be produced from ACH and urea at a high production yield when the reaction is carried out in a medium of water or a mixture of water and an organic solvent while maintaining the pH of the reaction system in the range of 1.0 to 2.5. CDU are produced in a solid form in these methods but since CDU is difficultly soluble in water or an organic medium, the presence of a suitable amount of water or a mixture of water with an organic solvent, as a medium, enables to readily produce a high purity CDU in powdered form.

The above-mentioned reaction accompanies a violent exotherm, amounting to 31 Kcal. per mol of CDU. The greater part of this violent exotherm occurs immediately after mixing of ACH with urea. The following reaction step of CDU formation is relatively mild. A considerably long time is necessary to complete this reaction. As usual, it is preferable to maintain the temperature of reaction system at a high value in order to promote the formation of CDU. However, on the other hand, too high a temperature accelerates the hydrolysis of CDU, resulting in the reduction of the nitrogen content of the product. Accordingly, there is a suitable temperature range for this reaction which preferably does not excel 80° C. much.

As above-mentioned CDU gradually precipitates as insoluble powdered solid in the reaction liquid which deposits and adheres to the wall surface of a reactor and a cooler. When gradually grown, it forms so-called scale and prevents the heat transmission, making the removal of reaction heat through the wall of the reactor and the cooler and hence the control of the reaction system within a suitable range difficult. Particularly in the reaction apparatus of the commercial scale, it is impossible to maintain the reaction system within a desired range of temperature unless a large amount of medium is used to absorb the reaction heat and suppress the temperature elevation. The use of large amount of medium is not economical because it retards the formation of CDU, and reduces the production of CDU per unit volume of a reactor.

In the continuous production process of CDU from ACH and urea, it has been known by the German Patent No. 1,176,639 to mix both the raw materials in two or more of reactors connected in series to remove the reaction heat and maintain the preferable reaction temperature while maintaining the internal pressure of the first reactor at a pressure lower than atmospheric and evaporating water and ACH from the reactors to take off the reaction heat by the latent heat of evaporation. Since this method enables to remove not only the reaction heat but also the water formed during the reaction, it is indeed based upon an excellent idea. However it is necessary to maintain the pressure in the inside of the reactor at a relatively low value such as 220 mm. Hg abs. to make the reaction temperature lie in the preferable range. On this account, the violent evaporation occurs in the reactor, forming a large amount of splash which necessitates the use of a large volume reactor. Further in order to catch the ACH vapor simultaneously formed in this process, the washing is carried out under a reduced pressure using an aqueous solution of urea. For the purpose of efficient catch of ACH vapor, a scrubbing tower of a large volume is needed. Such reactors and a scrubber must have sturdy construction to withstand the reduced pressure. Moreover according to the description of the above-mentioned German patent, the water vapor leaving the scrubber of the aqueous urea solution contains still 2 percent by weight of ACH and the recovery of ACH from the condensate thereof must be considered.

The relationship of exotherm and the starting point of the precipitation of CDU to reaction temperatures was measured by the present inventors by mixing ACH with an aqueous solution of urea whose pH had been adjusted at a value ranging from 1.0 to 2.0. The result of this measurement is shown in FIGURE 1. In this measurement, liquid ACH was added relatively rapidly to the liquid surface of the aqueous urea solution maintained at a low temperature with stirring in an insulated vessel, the temperature of the reaction system was raised by the exotherm and the temperature of the aqueous urea solution used in the reaction was varied so as to adjust the maximum temperature appearing in the vicinity of CDU precipitation. The temperature variations during the course of the reaction were measured. These measured values were corrected by the temperature reduction calculated based upon the measured value of heat dissipation from the reactor. The point at which the corrected temperature does not indicate variation, is set as an end point of the reaction. All the temperature variations were expressed by percent based upon the difference between the corrected temperatures of the start and that of the end of the reaction. The reaction conditions of each curve indicated in FIGURE 1 are shown on the Table 1.

TABLE 1

|  | Urea (g.) | ACH (g.) | Water (g.) | pH | Measured maximum temperature (° C.) |
| --- | --- | --- | --- | --- | --- |
| Curve 1 | 60 | 44 | 120 | 1.0 | 75.0 |
| Curve 2 | 90 | 44 | 120 | 1.7 | 62.5 |
| Curve 3 | 78 | 44 | 120 | 1.7 | 56.5 |

In FIGURE 1, the marks X indicate the end point of addition and the marks ↓ indicate the precipitation points of CDU. Apparently from the FIGURE 1, the 70% of the heat evolution during the entire reaction course occurs during the time of mixing of ACH with urea. The heat evolution, then, sinks for a moment but once again becomes active and sinks gradually again toward the completion of the reaction. However, the heat evolution just after the start of CDU precipitation is not so violent as during the time of mixing of ACH with urea. The amount of heat evolved after the starting of CDU precipitation is not so great as that at the time of raw material mixing, amounting to about 20 percent of the total heat evolved during the entire course. Further it has been found that there is time of more than several minutes from the mixing of raw material to the precipitation of CDU. Accordingly, it has been found that the greater part of the reaction heat can be efficiently removed from the walls of the reactor or cooler without forming scale thereupon during the time from the start of reaction to the precipitation of CDU and the remaining part of the reaction heat can be satisfactorily removed even through the scale-formed wall and thus the reaction temperature can be kept at a desired value.

Next, the relationship between reaction temperature and time required for CDU precipitation has been pursued in the case where liquid ACH and aqueous urea solutions have been continuously fed to a reactor to effect reaction and reaction liquids have been continuously withdrawn. Specifically, about 38 percent aqueous urea solution by weight the pH of which has been adjusted by concentrated hydrochloric acid to about 1.6 and liquid ACH are continuously fed to a reactor in a proportion of urea to ACH of about 1.3:1 to effect reaction, and continuously withdrawn by overflowing the reacted liquid while controlling the liquid level of the reactor thereby to control the residence time of the reacted liquid.

In this case the relationship between the reaction temperature and the time of CDU precipitation is as shown in Table 2.

TABLE 2

| Reaction temperature, ° C.: | Time of CDU precipitation, min. |
| --- | --- |
| 75±2 | 4–7 |
| 70±2 | 6–9 |
| 60±2 | 10–15 |
| 50±2 | 15–20 |
| 45±1 | 20–25 |
| 40±1 | 30–40 |
| 35±1 | 50–60 |

The desired temperature for carrying out the method of the present invention lies in the range of 30 to 80° C.

Figure 2:
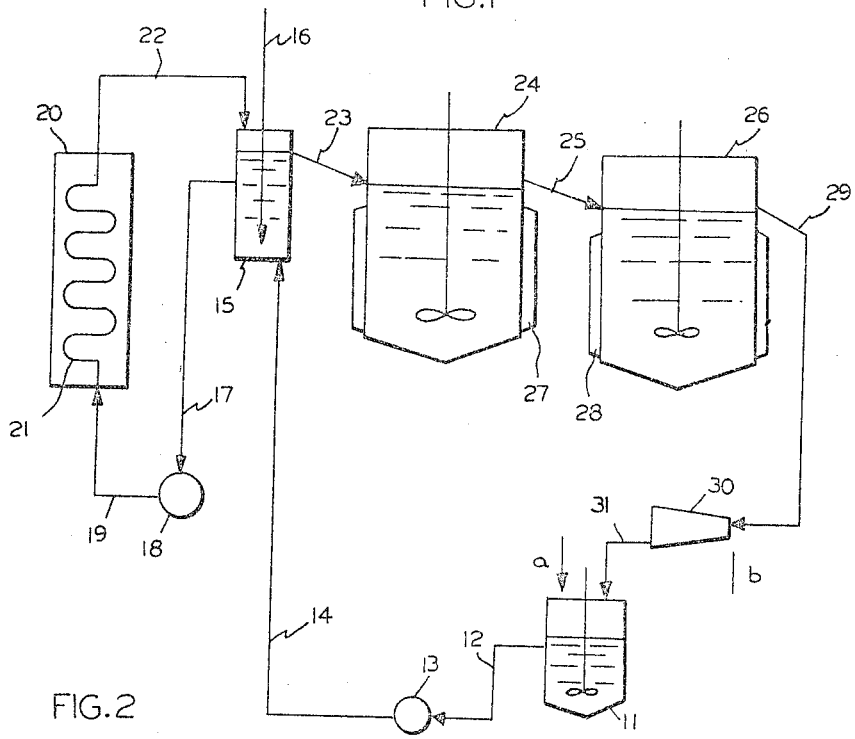

A preferred embodiment of the present invention has been chosen for purposes of illustration and description and is shown in FIGURE 2 which is a flow-sheet diagram of continuous method for producing CDU. In this FIGURE 11 is a vessel for preparing aqueous urea solution and the mother liquor of the reaction from which CDU has been separated by a centrifugal separator 30, is continuously or intermittently charged to the vessel 11 through a pipe 31. To this solution, solid or concentrated aqueous solution of urea is continuously or intermittently supplied and an aqueous urea solution of a desired concentration is prepared with stirring. (An arrow mark a↓ means supply of urea). In order to adjust the pH of the reaction liquid, it is possible to feed acid to the vessel 11.

The aqueous urea solution is withdrawn by a pump 13 through a pipe 12 at a fixed rate and fed to a mixing vessel 15 which constitutes a part of the first reactor. When ACH is fed to the liquid phase of the mixing vessel 15 through a pipe 16, the exothermic reaction proceeds violently. The reaction liquid is withdrawn by a pump 18 through a pipe 17, sent through a pipe 19 to the cooling pipe 21 of a cooler 20 where it is cooled and returned to the mixing vessel 15 through a pipe 22. Thus, the reaction liquid is maintained in a desired temperature range by circulating between the mixing vessel 15 and the cooler 20. The first step reactor is constructed of the above-mentioned mixing vessel 15, the circulating pump 18 and the cooler 20.

The reaction liquid which has become surplus in the first reactor due to the feed of the aqueous urea solution and the ACH fed to the mixing vessel 11 overflows automatically from the mixing vessel 15 through a pipe 23 to the second reactor 24 continuously where it forms and precipitates CDU in the form of slurry while being agitated by a mechanical means.

Further the reaction liquid is transferred automatically through an overflow-pipe 25 to the third reactor 26 and completes the reaction with stirring.

The residence time of the reaction liquid in the first reactor can be readily adjusted by controlling the amount of feed of the raw material and the liquid level of the mixing vessel 15 by the adjustment of the height of the over-flow pipe 23. In order to control the residence time of the reaction liquid in the first reactor with a constant feed of the raw material, it is preferable to make the difference of the level between the mixing vessel 15 and the second reactor 24 sufficiently high.

The residence times of the reaction liquid in the second and the third reactor can be controlled by the similar means.

As above-mentioned, the reaction heats evolved in the second and the third reactors are relatively small and not so violent that the temperature control in these reactors is simple. 27 and 28 are jackets attached to the second and the third reactors, respectively, and appropriate amounts of water or warm water maintained at appropriate temperatures are passed therethrough. (The cooling water, having been used in the cooler 20, can be reused here.) Since solid CDU precipitates in the reactors 24 and 26, scale is formed on the wall of these reactors but if it is scraped off from time to time, there will be no fear of the uncontrollability of the reaction temperature due to the hinderance of the heat conductivity through the vessel wall.

The slurry of the reaction liquid containing fine solid CDU which has been overflown from the third reactor is fed through a pipe 29 to a centrifugal separator. Dehydrated wet powder is discharged continuously from here (as indicated by an arrow mark ↓b in the figure ).

The reaction liquid freed of CDU on one hand (generally containing urea used excessively) is fed through a pipe 31 to the vessel 11 and after supplied with fresh urea, is recirculated to the reactor. The centrifugal separator needs not necessarily to be a continuous type. In order to carry out centrifugal separation in a batch manner, it is preferable to provide a controlling vessel for storing the slurry of the reaction liquid but it is not always necessary because the third reactor can serve both the functions.

Generally the wet powder of CDU separated from the centrifugal separator contains a considerable amount of water. (10–35% by weight), hence when solid urea is used, the water formed by the reaction (2 mols per mol of CDU) is removed from the reaction system together with CDU and there is no fear of water becoming excessive in the reaction system. In such an instance, water solution is used as an urea source, water becomes excessive in the reaction system. In such an instance, water can be removed from the reaction system by concentrating the reaction liquid separated from the centrifugal separator, to an appropriate concentration.

Though three reactors are used in FIGURE 2 but this does not mean that three are absolutely necessary. Two or more reactors can also be used to attain the present purpose.

The present invention may be more fully understood from the following examples which are offered by way of illustration and not by way of limitation.

EXAMPLE

To the first reactor consisting of a mixing vessel and a cooler and having a combined inner volume of about 110 l., about 240 l. per hour of aqueous urea solution (containing about 400 g. of urea in 1000 cc.) whose pH had been adjusted to 1.5–20 by sulfuric acid, and about 55 kg. per hour of liquid acetaldehyde were continuously fed. The reaction liquid was circulated between the reactor and the mixing vessel at a rate of about 3.0 m.³ per hour to maintain its temperature at 45±1° C. by cooling with water. The height of the overflow outlet of the first reactor was fixed so as to make the retention amount of the reaction liquid in the first reactor about 95 l. The reaction liquid which became surplus due to the feed of raw material was over-flown to the second reactor having about 800 l. of inner volume, successively and continuously to the third and the retention time of the reaction liquid in the second and the third reactor was adjusted each to about 2.0 hours. The slurry of the reacted liquid containing powder of CDU which had been overflown from the third reactor was subjected to centrifugal separation to yield wet CDU and solid urea was dissolved in the mother liquor separated from the centrifugal separator and recirculated to the first reactor. At the above-mentioned reaction condition, the mean residence time of the reaction liquid in the first reactor was about 18 minutes. There was no precipitation of CDU in the first reactor but about 70% of the reaction heat evolved during the entire course of the reaction was caught here. Even without providing any cooling means, the reaction temperature of the second and the third reactor could be maintained at 50 to 55° C. by the heat dissipation through the reactor walls. By such an arrangement, continuous production of CDU can be continued over 120 days, affording 95% yield based upon the urea used.

According to the above-mentioned reaction condition, the mean time of the reaction liquid staying in the first reactor is about 18 minutes but even at the same reaction temperature, when the retention time of the reaction liquid in the first reactor was made to be about 20 minutes, the removal of the reaction heat became difficult after 5 days and when the retention time of the reaction liquid in the first reactor was made to be 25 minutes, the control of the reaction temperature became impossible within several hours after starting of the reaction.

What is claimed is:

1. A continuous process for the manufacture of 2-oxo-4-methyl-6-ureido-hexahydropyrimidine which consists essentially of
    (a) subjecting urea and acetaldehyde in an aqueous solution at a pH within the range of 1.0–2.5 in a first reaction zone to a condensation reaction by use of a strong acid catalyst,
    (b) removing about 70% of the heat of reaction of the reactants introduced into said first reaction zone by heat transfer through the walls confining the liquid materials that are present in said first reaction zone, maintaining the temperature of the liquid materials in said first reaction zone between 30 and 80° C.,
    (c) transferring a part of the liquid material in the first reaction zone to at least one subsequent reaction zone before the precipitation of 2-oxo-4-methyl-6-ureido-hexahydropyrimidine starts,
    (d) continuing the reaction between unreacted urea and acetaldehyde in said at least one subsequent reaction zone while maintaining the temperature in said at least one subsequent reaction zone between 30 and 80° C., and
    (e) recovering the 2-oxo-4-methyl-6-ureido-hexahydropyrimidine.

2. The continuous process of claim 1 wherein said strong acid catalyst is selected from the group consisting of sulfuric acid and hydrochloric acid.

References Cited

UNITED STATES PATENTS

| | | | |
|---|---|---|---|
| 2,931,812 | 5/1960 | Kalm | 260—256.4 |
| 3,105,077 | 9/1963 | Muller et al. | 260—256.4 |
| 3,329,519 | 7/1967 | Mills | 260—256.4 |

FOREIGN PATENTS

| | | |
|---|---|---|
| 1,176,639 | 8/1964 | Germany. |

ALEX MAZEL, Primary Examiner

R. J. GALLAGHER, Assistant Examiner